(12) United States Patent
Wang (10) Patent No.: US 11,415,403 B2
(45) Date of Patent: Aug. 16, 2022

(54) FIT FINDER TOOL

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 17/210,268

(22) Filed: Mar. 23, 2021

(65) Prior Publication Data
US 2021/0348908 A1 Nov. 11, 2021

Related U.S. Application Data

(60) Provisional application No. 63/022,922, filed on May 11, 2020.

(51) Int. Cl.
*G01B 5/02* (2006.01)

(52) U.S. Cl.
CPC ...................... *G01B 5/02* (2013.01)

(58) Field of Classification Search
CPC .............................. G01B 5/02; B23Q 17/2233
USPC ......... 33/520, 613, 628, 630, 632, 638, 640, 33/642
See application file for complete search history.

(56) References Cited

U.S. PATENT DOCUMENTS

| | | | |
|---|---|---|---|
| 2,627,118 A | 2/1953 | Young | |
| 3,672,065 A * | 6/1972 | Voss | B23Q 17/225 33/642 |
| 4,458,422 A | 7/1984 | Nishikata et al. | |
| 4,607,434 A * | 8/1986 | Francis | B23Q 9/005 33/630 |
| 4,779,354 A * | 10/1988 | Hill | B23Q 17/2216 33/640 |
| 5,207,007 A * | 5/1993 | Cucinotta | G01B 5/24 33/534 |
| 5,546,670 A * | 8/1996 | Chiang | B23D 59/002 33/DIG. 1 |
| 5,996,946 A | 12/1999 | Bailey | |
| 6,138,372 A * | 10/2000 | Newman | B23Q 9/005 409/181 |
| 6,263,584 B1 * | 7/2001 | Owens | B23Q 17/24 33/DIG. 1 |
| 6,637,988 B1 | 10/2003 | Park | |
| 6,665,946 B1 * | 12/2003 | Reilly | B23D 59/002 33/640 |
| 7,226,257 B2 | 6/2007 | Lowder et al. | |
| 7,260,897 B1 | 8/2007 | Neff | |
| 7,448,419 B1 | 11/2008 | Sommerfeld | |
| 8,904,660 B2 * | 12/2014 | Grazulis | B23Q 9/0028 33/640 |
| 9,120,241 B2 * | 9/2015 | Holladay | B23Q 9/005 |

(Continued)

OTHER PUBLICATIONS

PCT/US21/23736 International Search Report and Written Opinion, dated Jun. 21, 2021, 9 pages.

*Primary Examiner* — George B Bennett
(74) *Attorney, Agent, or Firm* — Wolter Van Dyke Davis, PLLC; Robert L. Wolter (57) ABSTRACT

An apparatus (100), including: a base reference contact (102) configured to correspond with a first point on a workpiece; a dimension contact (120) configured to move relative to the base reference contact along a dimension axis (124) and to correspond with a second point on a workpiece; and a pointer (162) operatively associated with the dimension contact such that movement of the dimension contact moves the pointer along the dimension axis an amount (X % D) that is proportional to and less than an amount (D) the dimension contact moves along the dimension axis.

22 Claims, 12 Drawing Sheets

(56) References Cited

U.S. PATENT DOCUMENTS

| | | | | |
|---|---|---|---|---|
| 2014/0331510 A1* | 11/2014 | Yamane | ............... | B23H 11/003 |
| | | | | 33/520 |
| 2021/0138602 A1* | 5/2021 | Metcalfe | ............ | B23Q 17/2233 |
| 2021/0372762 A1* | 12/2021 | Yamaji | ................... | G01B 3/008 |

* cited by examiner

FIT FINDER TOOL

This application claims benefit of the May 11, 2020 filing date of provisional application 63/022,922 which is incorporated by reference herein.

FIELD OF THE INVENTION

The invention relates to a tool that determines a position that is a select percent of a distance between two points.

BACKGROUND OF THE INVENTION

In the fabricating arts, e.g. woodworking, metalworking, there are many times when it may be required to locate a certain point in a workpiece. For example, certain cuts must have a depth that is a particular thickness of the workpiece, such as half of the thickness. Proper setup of the cutting tool often requires trial and error settings that may adjusted until the proper can is made. This process is an inefficient use of time and may result is wasted material. Hence, there is room in the art for improvement.

BRIEF DESCRIPTION OF THE DRAWINGS

The invention is explained in the following description in view of the drawings that show.

DETAILED DESCRIPTION OF THE INVENTION

The inventor has developed a unique and innovative fit finder tool that indicates a position that is a select percentage of a distance between two points. This fit finder tool can be used in a variety of ways to simplify fabricating projects. For example, the fit finder tool can be used to find a halfway point (or ⅓ etc.) of a piece of stock. Knowing this point enables fast and efficient setup of machining tools.

Figure 1:
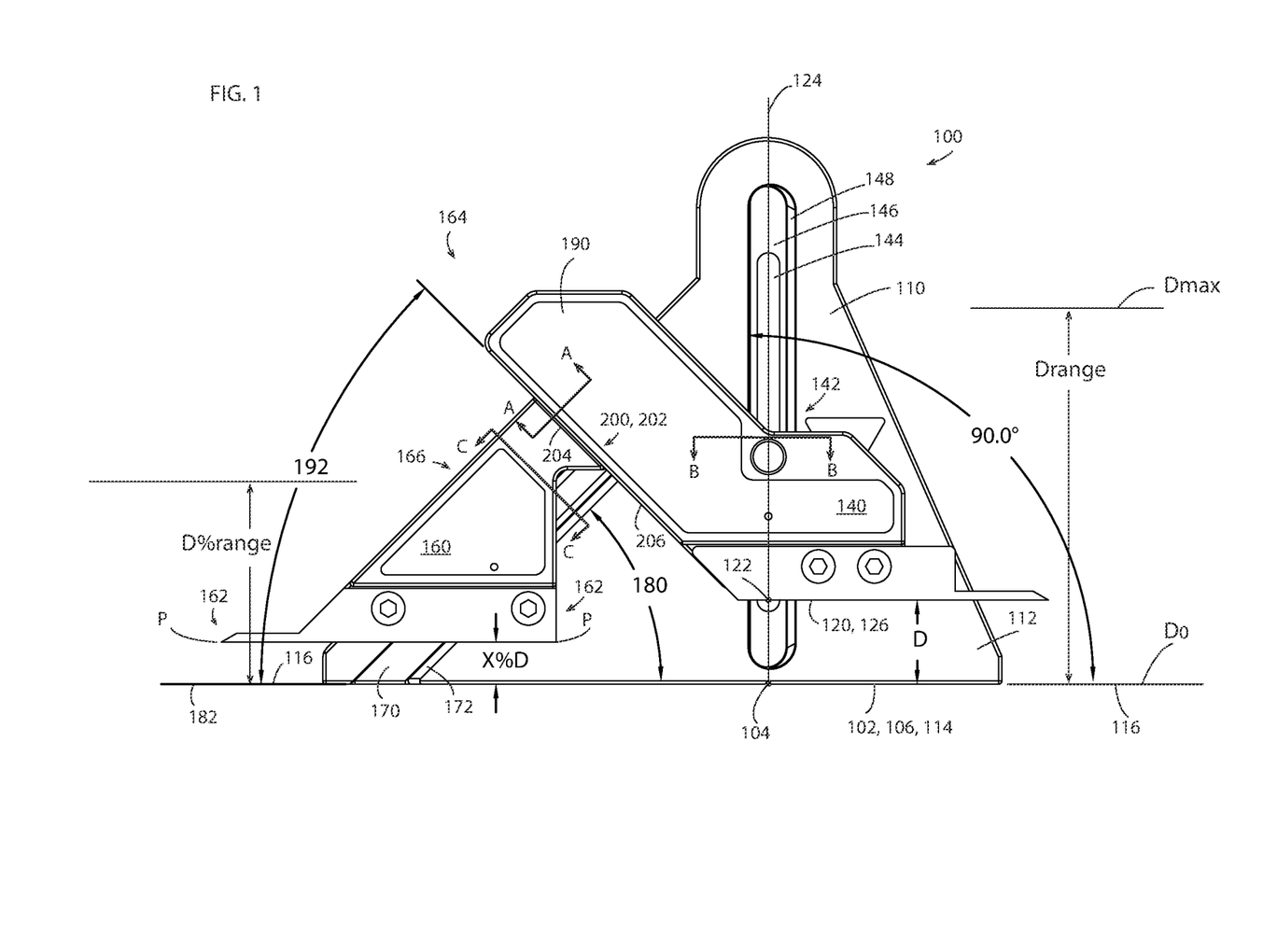
FIG. 1 is a front view of an example embodiment of a fit finder tool.

FIG. 1 is a front view of an example embodiment of a fit finder tool 100 having a base reference contact 102 that defines a base reference point 104. The base reference point 104 serves as a reference end of a dimension to be measured, and the base reference contact 102 is a physical manifestation of the base reference point 104 that contacts the object to be measured or that contacts a flat surface on which the object to be measured rests. The base reference contact 102 may be a physical point that corresponds to the base reference point 104. Alternately, in the example embodiment shown, the base reference contact 102 may define a base contact plane 106 that corresponds to the base reference point 104. The fit finder tool 100 includes a base component 110 comprising a base end 112. The base end 112 defines the base reference contact 102, whether the base reference contact 102 is a point or a plane. When the base reference contact 102 defines the base contact plane 106 (in and out of the page as shown in FIG. 1), the base end 112 does so either by having a flat surface 114 itself, or alternately, by defining the base contact plane 106 with at least three contact points (not shown). When the base end 112 defines the base contact plane 106, the base end 112 is configured to rest atop a flat surface 116, e.g. a tabletop. In this instance, the flat surface 116 is coplanar with the base contact plane 106. As such, any object that rests on the flat surface 116 is also resting on the base contact plane 106.

The fit finder tool 100 further includes a dimension contact 120 that defines a dimension contact point 122 configured to move along a dimension axis 124 that connects the base reference point 104 and the dimension contact point 122. The dimension contact point 122 is the reference point for the other end of the dimension to be measured, and the dimension contact 120 is a physical manifestation of the dimension contact point 122 and contacts the object to be measured. The dimension contact 120 may be a physical point that corresponds do the dimension contact point 122. Alternately, in the example embodiment shown, the dimension contact 120 is elongated and the dimension contact point 122 is associated with the elongated dimension contact 120. In the example embodiment shown, the elongated dimension contact 120 includes a dimension contact planar surface 126 (in and out of the page as shown in FIG. 1) that is disposed parallel to the base contact plane 106 defined by the base reference contact 102.

Accordingly, in the embodiment shown, the base reference contact 102 defines the base contact plane 106 and the dimension contact 120 defines the dimension contact planar surface 126 that is parallel to the base contact plane 106. In this embodiment, a distance D along the dimension axis 124 is defined as a shortest distance between the base reference point 104 and the dimension contact point 122. In this example embodiment, the distance D is the same regardless of where between the base reference contact 102 and the dimension contact 120 the distance D is taken, so a dimension to be measured can be placed laterally anywhere so long as it is sandwiched between the base reference point 104 and the dimension contact point 122.

In an alternate embodiment, (not shown), the base reference contact 102 is a point (similar to a probe tip) and the dimension contact 120 is a point (similar to another probe tip), a distance D is defined as the distance between the base reference point 104 and the dimension contact point 122 along the dimension axis 124. As such, the dimension to be measured must be positioned exactly between base reference contact 102 and the dimension contact 120 to coincide with the distance D. In an example embodiment, the base reference contact 102 can be configured to rest on top of the flat surface 116 and operate similar to the embodiment where the base reference contact 102 defines the base contact plane 106. In another embodiment, the base reference contact 102 can be configured to rest below an object to be measured, so that the base reference contact 102 and the dimension contact 120 sandwich the object to be measured therebetween (similar to a caliper).

The fit finder tool 100 further includes an intermediate component (IC) 140 that includes the dimension contact 120. The dimension contact 120 may be an attached part of the intermediate component 140 as is shown, or the dimension contact 120 may be an integral part of a monolithic intermediate component 140. The dimension contact is configured to move relative to the base component 110 along the dimension axis 124 via an IC/base engagement 142. In the example embodiment shown, the IC/base engagement 142 includes a first slot 144 in a first recess 146 in the base component 110. The first recess 146 includes a first recess taper 148. The intermediate component 140 includes geometry (not visible in FIG. 1) that interacts with the first recess 146 to ensure that the intermediate component 140 slides precisely along the first slot 144. The first slot 144 is parallel to the distance D. When the base reference contact 102 defines the base contact plane 106 and the dimension contact 120 defines the dimension contact planar surface 126 that is parallel to the base contact plane 106, the dimension axis 124 is also oriented at ninety (90) degrees to the base contact plane 106 and the dimension contact planar surface 126. This, in turn, orients the dimension axis 124 perpendicular to the flat surface 116.

The intermediate component 140 moves along the dimension axis 124 along a range Drange bounded at the bottom by D0, which corresponds to a dimension of zero, to Dmax, which corresponds to a maximum dimension. In an example embodiment, Dmax is three inches. However, the fit finder can be scaled so any Dmax is possible. Drange is the range of dimensions the fit finder tool 100 can measure. As such, any dimension can be measured so long as it is equal to or less than Dmax.

The fit finder tool 100 further includes a pointer component 160 having a pointer 162 configured to move relative to the dimension axis 124 proportionally as the dimension contact 120 moves along the dimension axis 124 via a geometric arrangement 164. The pointer 162 indicates a position P along the dimension axis 124 that is a select percentage "X % D" of the distance D along the dimension axis 124 between the base reference point 104 and the dimension contact point 122. In the embodiment shown, the distance D is also between the base contact plane 106 and the dimension contact planar surface 126. The pointer 162 may be an attached part of the pointer component 160 as is shown, or the pointer 162 may be an integral part of a monolithic pointer component 160. Moreover, the pointer 162 may be a point, an edge, or a flat surface.

The geometric arrangement 164 includes a PC/base engagement 166. In the example embodiment shown, PC/base engagement 166 includes a second slot 168 (not visible in FIG. 1) in a second recess 170 in the base component 110. The second recess 170 includes a second recess taper 172. The pointer component 160 includes geometry (not visible in FIG. 1) that interacts with the second slot 168 to ensure the pointer component 160 slides precisely along the second slot 168. The second slot 168 and second recess 170 are oriented at a second (slot) angle 180 relative to the dimension axis 124. In the embodiment shown, the second angle 180 is relative to a line 182 that extends perpendicular to the dimension axis 124. When the base reference contact 102 defines the base contact plane 106, the second angle 180 is relative to the base contact plane 106.

The geometric arrangement 164 further includes an intermediate arm 190 of the intermediate component 140 that extends at a first (arm) angle 192 relative to the dimension axis 124. The geometric arrangement 164 further includes an IC/PC engagement 200 between the intermediate arm 190 and the pointer component 160. The IC/PC engagement 200 comprises a sliding engagement 202 between the intermediate arm 190 and the pointer component 160 that permits a PC slide surface 204 of the pointer component 160 to slide along an IC slide surface 206 of the intermediate arm 190 of the intermediate component 140 as the intermediate component 140 moves along the dimension axis 124. The geometry of the IC/PC engagement 200 and the PC/base engagement 166 determines what the numerical value for X will be in X % D. Specifically, what percentage of the distance D the pointer 162 will indicate will depend on what angle is chosen for the first angle 192 and what angle is chosen for the second angle 180.

In an example embodiment, the first angle 192 is forty five (45) degrees and the second angle is also forty five (45) degrees. In this example embodiment, this results in a numerical value for X which is fifty (50), so X % D is 50% D. This means that the pointer 162 will indicate a position P dimension that is 50% (half) of the dimension D along the dimension axis 124. For example, if an object having a dimension of two inches is sandwiched between the base reference point 104 and the dimension contact point 122, the distance D will be two (2) inches, so the pointer will indicate a position P that is one (1) inch along the dimension axis 124. In the embodiment where the base reference contact 102 defines the base contact plane 106 and the dimension contact 120 defines the dimension contact planar surface 126, the pointer will indicate a position P that is one (1) inch from the base contact plane 106 and hence one (1) inch from the flat surface 116 along the dimension axis 124. Such a configuration may be considered a "half finder."

If a user seeks to find a midpoint in a workpiece, the user would simply place the workpiece on the flat surface 116 and lower the dimension contact 120 onto the workpiece. The pointer 162 automatically indicates the position P that is the midpoint. The user can use the position P of the pointer 162 to mark the midpoint on the workpiece. If the flat surface 116 is a working surface of a tool, for example, a table saw or router table, the pointer 162 can be used to position a saw blade or router bit relative to the midpoint of the object. This way, the saw or bit will be properly centered in the object with less need or no need for any trial and error cuts.

Figure 2A:
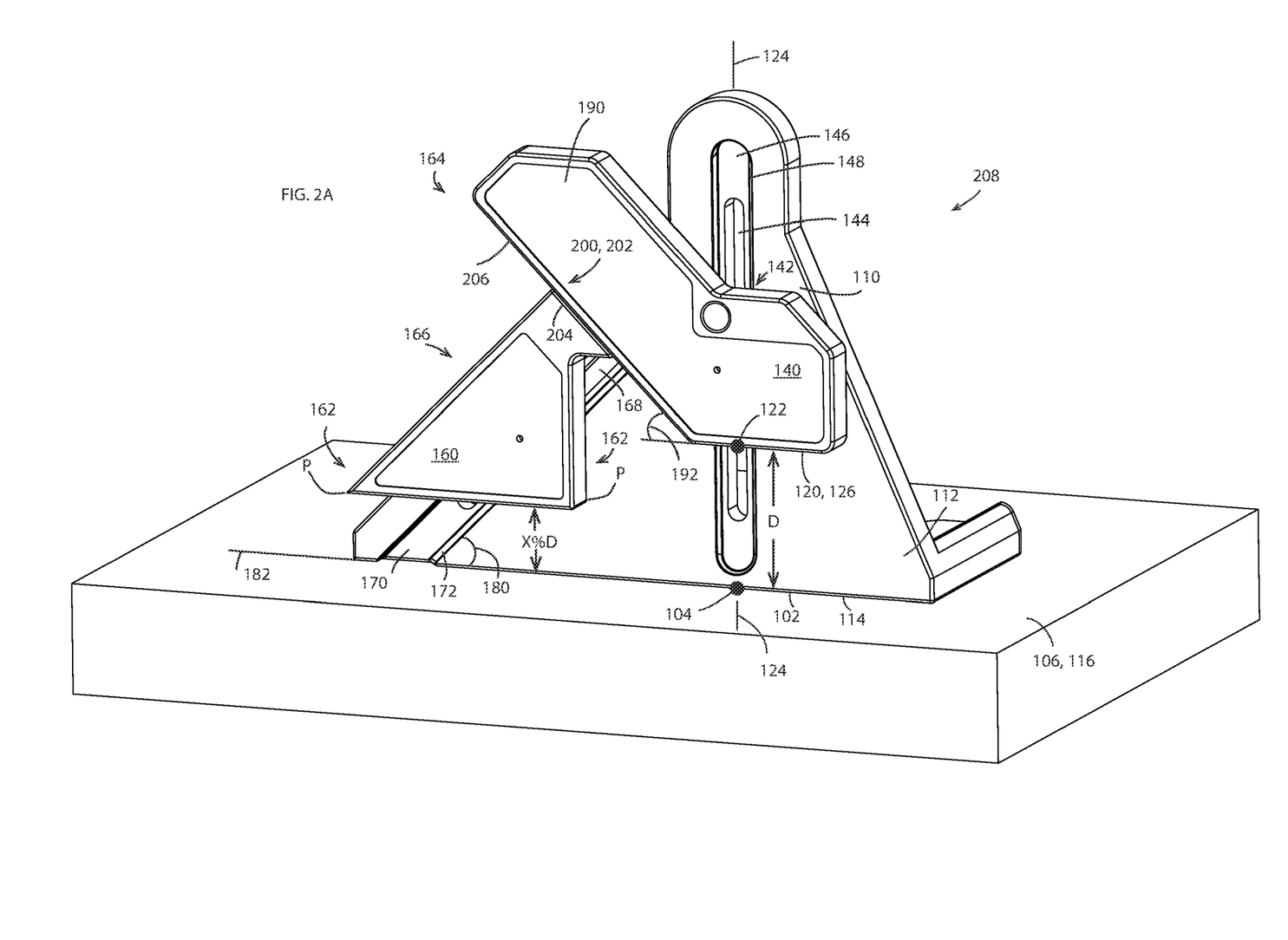
FIG. 2A is a perspective view of an alternate embodiment of the fit finder tool of FIG. 1.

FIG. 2A is a perspective view of an alternate embodiment of the fit finder tool 208. In the example embodiment of FIG. 1, the dimension contact 120 is an attached part of the intermediate component 140. In the alternate example embodiment of FIG. 2A, the dimension contact 120 is an integral part of a monolithic intermediate component 140. In the example embodiment of FIG. 1, the detachable dimension part could be swapped at will with dimension contacts 120 of various shapes and/or lengths. This expands how much of the flat surface 116 can be used for measurement. Moreover, if an object to be measured has a particular geometry, the dimension contact 120 could be shaped to accommodate and challenges presented by the particular geometry so that accurate measurements of dimension D can be taken.

Likewise, in the embodiment of FIG. 1, the pointer 162 is an attached part of the pointer component 160. In the alternate example embodiment of FIG. 2A, the pointer 162 is an integral part of a monolithic pointer component 160. In the example embodiment of FIG. 1, the detachable pointer component 160 could be swapped at will with pointer components 160 of various shapes and/or lengths. This expands how the pointer can be used. For example, if a tool has a particular geometry, the pointer 162 could be shaped to accommodate and challenges presented by the particular geometry.

Figure 2B:
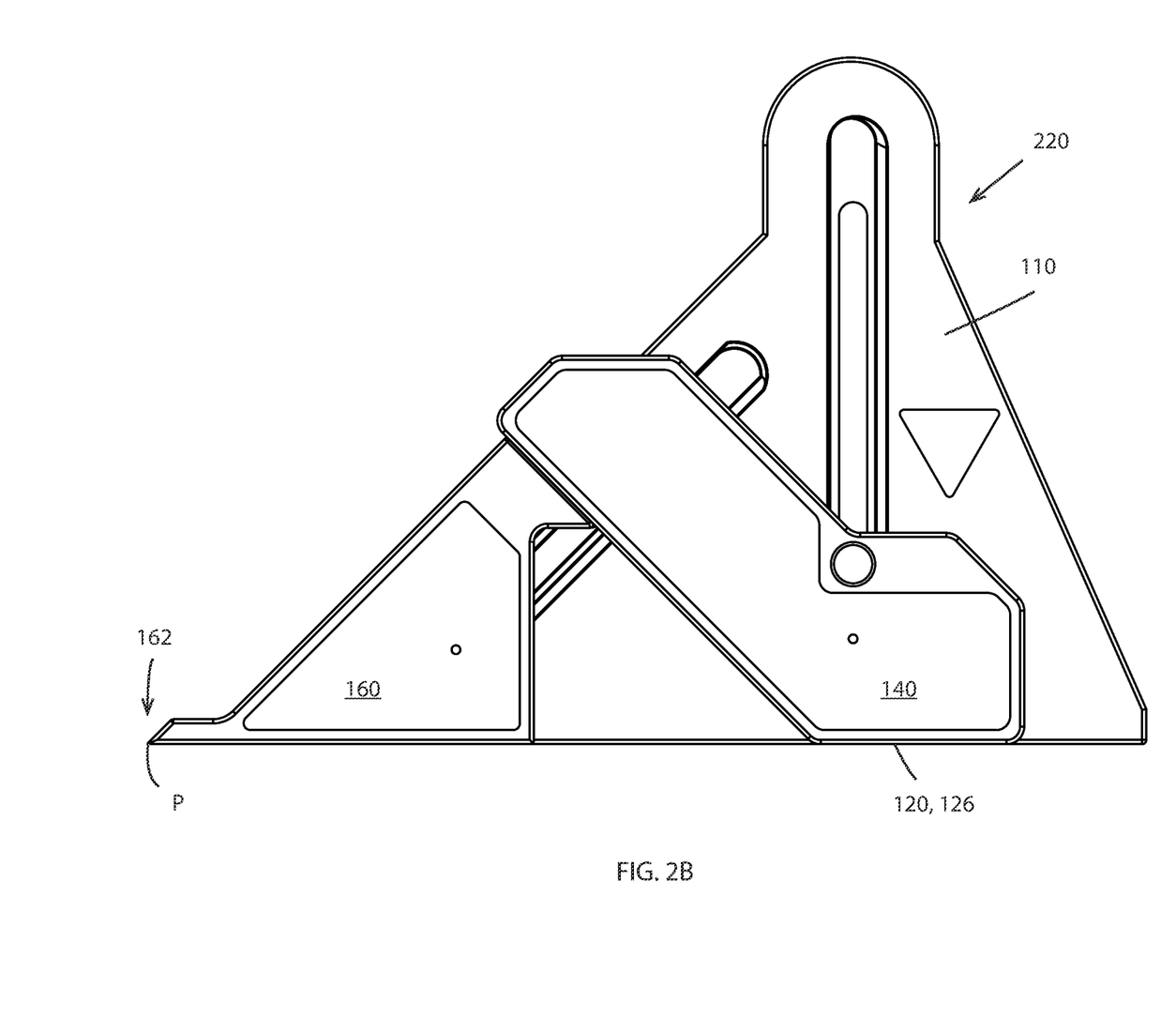
FIG. 2B is a perspective view of an alternate embodiment of the fit finder tool of FIG. 1.

FIG. 2B is a perspective view of an alternate embodiment of the fit finder tool 220. In the alternate example embodiment of FIG. 2B, similar to the example embodiment of FIG. 2A, the dimension contact 120 is an integral part of the monolithic intermediate component 140. Likewise, the pointer 162 of FIG. 2B is an integral part of the monolithic pointer component 160. In the example embodiment of FIG. 2B, the monolithic pointer component 160 has a shape that is similar to that of the pointer component 160 plus that of the pointer 162 of the example embodiment of FIG. 1. Stated another way, the example embodiment of FIG. 2B combines the pointer component 160 and the pointer 162 into a monolithic body. It could also be stated that the monolithic pointer component 160 of FIG. 2B is a reshaped version of the monolithic pointer component 160 of FIG. 2A.

Figure 3:
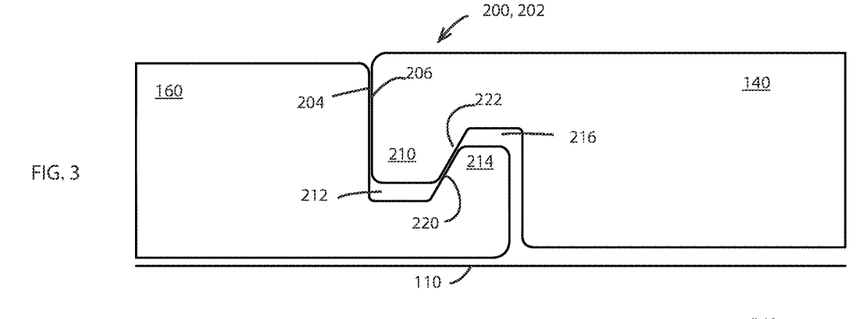
FIG. 3 is a view along line A-A in FIG. 1 showing the IC/PC engagement.

FIG. 3 is a view along line A-A in FIG. 1 showing an example embodiment of the IC/PC engagement 200. In the example embodiment shown, the IC/PC engagement 200 is a sliding engagement 202 in which an IC sliding joint projection 210 fits into a cooperating PC recess 212, and a PC sliding joint projection 214 fits into a cooperating IC recess 216. In an example embedment, the PC recess 212 and the IC recess 216 are both slots/grooves that extend in and out of the page as seen in FIG. 3. The IC sliding joint projection 210 and the PC sliding joint projection 214 may take a cooperating shape such as a negative shape of the slot/groove and may be elongated in and out of the page as shown in FIG. 3. Alternately, one of the IC sliding joint projection 210 and the PC sliding joint projection 214 may be shaped like a pin or any other suitable shape that would slide in the slot/groove as intended.

In the example embodiment shown, movement of the intermediate component 140 and the pointer component 160 relative to the base component 110 requires that there be a looseness/play between the components. This looseness would prevent the pointer 162 from making an accurate indication. Hence, the fit finder tool 100 must be able to be loose for positioning, and then the looseness must be taken out so the pointer 162 can make an accurate indication. To accomplish this, each of the engagements requires a reference (e.g. known) interaction between the engaged parts. For example, in the IC/PC engagement 200, the PC slide surface 204 of the pointer component intermediate component abuts the IC slide surface 206 when the looseness is removed.

To accomplish this, the PC recess 212 has a PC recess taper 220 and the cooperating IC recess 216 has an IC recess taper 222 that cooperates with the PC recess taper 220 to ensure the reference PC slide surface 204 abuts the reference IC slide surface 206 before any other parts of the IC/PC engagement 200 contact each other (e.g. before the IC sliding joint projection 210 bottoms out in the cooperating PC recess 212 etc.). By doing this, it is known that there will never be an unwanted gap between the pointer component 160 and the intermediate component 140 when an indication is to be made, and hence the indication will be accurate and repeatable.

Figure 4A:
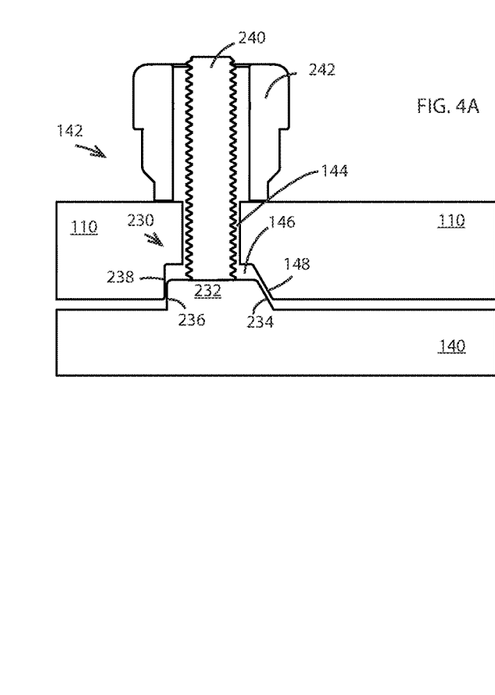
FIG. 4A is a view along line B-B in FIG. 1 showing the IC/base engagement.

FIG. 4A is a view along line B-B in FIG. 1 showing an example embodiment of the IC/base engagement 142. In the example embodiment shown, the IC/base engagement 142 includes the first slot 144 in the first recess 146 in the base component 110. The first recess 146 includes the first recess taper 148. The IC/base engagement 142 is a sliding engagement 230 in which a first recess IC projection 232 fits into and cooperates with the first recess 146. In an example embodiment, the first recess IC projection 232 may take a cooperating shape such as a negative shape of the first recess 146 and may be elongated in and out of the page as shown in FIG. 4A. Alternately, the first recess IC projection 232 may include two pins or any other suitable shape that would slide in the first recess 146 and maintain the orientation of the intermediate component 140 as intended.

In the example embodiment shown, the first recess IC projection 232 includes a first recess IC projection taper 234 and a first recess IC projection reference surface 236. The first recess 146 includes a first recess reference surface 238. The first recess IC projection taper 234 cooperates with the first recess taper 148 to ensure the first recess IC projection reference surface 236 abuts the first recess reference surface 238 before any other parts of the IC/base engagement 230 contact each other. By doing this, it is known that there will never be an unwanted gap between the intermediate component 140 and the base component 110 when an indication is to be made, and hence the indication will be accurate and repeatable.

To effect the cooperation of the first recess IC projection taper 234 and the first recess taper 148, an IC stud 240 passes through the first slot 144 and into an IC nut 242. Tightening the IC nut 242 pulls the intermediate component 140 toward the base component 110 and this causes the first recess IC projection taper 234 and the first recess taper 148 to cooperate until the first recess IC projection reference surface 236 abuts the first recess reference surface 238.

In this example embodiment, the intermediate component 140 sandwiches the pointer component 160 between the intermediate component 140 and the base component 110. As such, tightening the IC nut 242 also presses the IC sliding joint projection 210 into the cooperating PC recess 212, and likewise presses the PC sliding joint projection 214 into the cooperating IC recess 216 (see FIG. 3). This causes the IC recess taper 222 and the PC recess taper 220 to cooperate to ensure the PC slide surface 204 engages the IC slide surface 206 before any other surfaces of the IC/PC engagement 200 contact each other.

Figure 4B:
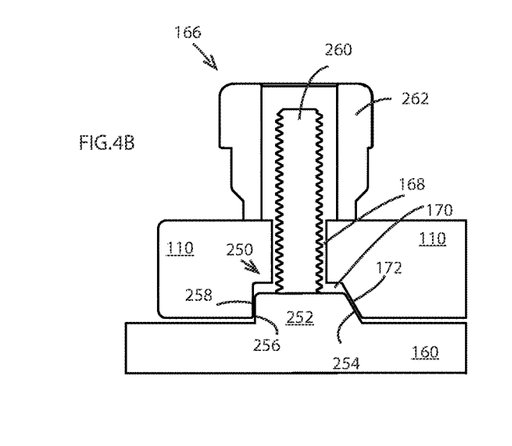
FIG. 4B is a view along line C-C in FIG. 1 showing the PC/base engagement.

FIG. 4B is a view along line C-C in FIG. 1 showing an example embodiment of the PC/base engagement 166. In the example embodiment shown, the PC/base engagement 166 includes the second slot 168 in the second recess 170 in the base component 110. The second recess 170 includes the second recess taper 172. The PC/base engagement 166 is a sliding engagement 250 in which a second recess PC projection 252 fits into and cooperates with the second recess 170. In an example embodiment, the second recess PC projection 252 may take a cooperating shape such as a negative shape of the second recess 170 and may be elongated in and out of the page as shown in FIG. 4B. Alternately, the second recess PC projection 252 may be two pins or any other suitable shape that would slide in the second recess 170 and maintain the pointer component 160 orientation as intended.

In the example embodiment shown, the second recess PC projection 252 includes a second recess PC projection taper 254 and a second recess PC projection reference surface 256. The second recess 170 includes a second recess reference surface 258. The second recess PC projection taper 254 cooperates with the second recess taper 172 to ensure the second recess PC projection reference surface 256 abuts the second recess reference surface 258 before any other parts of the PC/base engagement 166 contact each other. By doing this, it is known that there will never be an unwanted gap between the pointer component 160 and the base component 110 when an indication is to be made, and hence the indication will be accurate and repeatable.

To effect the cooperation of the second recess PC projection taper 254 and the second recess taper 172, a PC stud 260 passes through the second slot 168 and into a PC nut 262. Tightening the PC nut 262 pulls the pointer component 160 toward the base component 110 and this causes the second recess PC projection taper 254 and the second recess taper 172 to cooperate until the second recess PC projection reference surface 256 abuts the second recess reference surface 258.

The example embodiments of the engagements, reference surfaces, and tapers are not meant to be limiting. The artisan will recognize that the engagements could be reconfigured so different surfaces have tapers and different surfaces are reference surfaces.

Figure 5:
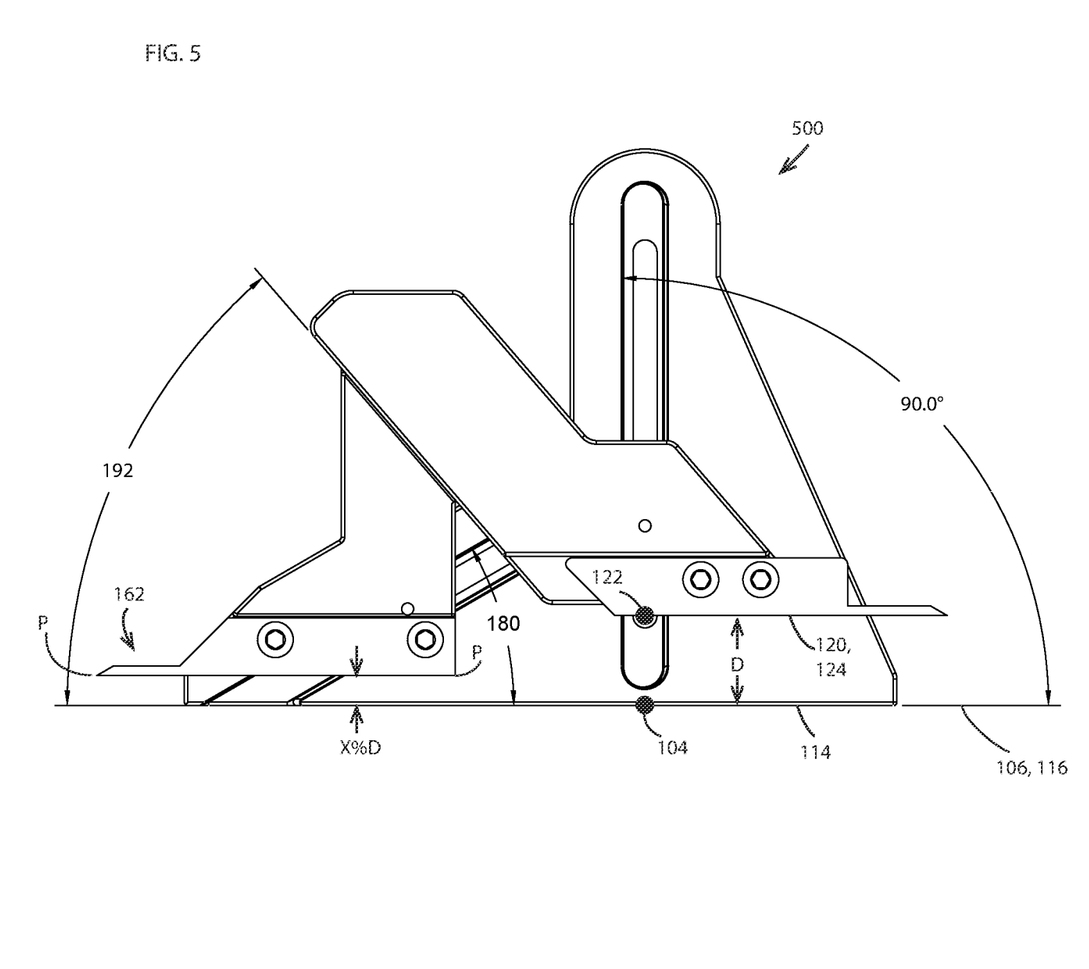
FIG. 5 is a front view of an alternate embodiment of the fit finder tool.

FIG. 5 is a front view of an alternate embodiment of the fit finder tool 500. This alternate embodiment is similar to the embodiment of FIG. 1, except for the first angle 192 and the second angle 180 and the resulting numerical value for X as a percentage of the distance D. In this example embodiment, the first angle 192 is 49.1 degrees. The second angle 180 is 30 degrees. In this example embodiment, this results in a numerical value for X which is ⅓, so X % D is 33.3% D.

This means that the pointer 162 will indicate a position P dimension that is one third (⅓) of the dimension D along the dimension axis 124. For example, if an object having a dimension of three inches is sandwiched between the base reference point 104 and the dimension contact point 122, the distance D will be three (3) inches, so the pointer will indicate a position P that is one (1) inch along the dimension axis 124. In the embodiment where the base reference contact 102 defines the base contact plane 106 and the dimension contact 120 defines the dimension contact planar surface 126, the pointer will indicate a position P that is one (1) inch from the base contact plane 106 and hence one (1) inch from the flat surface 116 along the dimension axis 124. Such a configuration may be considered a "third finder."

The embodiment of FIG. 5 was arrived at by changing both the first angle 192 of the IC slide surface 206, adjusting the second angle 180, and adjusting the orientation of the PC slide surface 204 to match the reoriented IC slide surface 204. The first slot 144 remains parallel to the dimension axis 124. As such, changing these parameters (e.g. changing both the first angle 192 and the second angle 180) is one way to achieve the desired percentage X of the distance D.

In alternate embodiments, to change the percentage X of the distance D, the second angle 180 could remain at forty five (45) degrees, the first angle 192 could be adjusted, and the PC slide surface 204 can be adjusted to match the reoriented IC slide surface 204. For example, increasing the first angle 192 from forty five (45) degrees to a larger value will result in the pointer component 160 moving less distance to the right horizontally when compared to the first embodiment in the embodiment where the first angle is forty five (45) degrees. Since a forty five (45) degree second angle 180 will cause the pointer component 160 to move vertically exactly as much as it moves horizontally, and since the horizontal movement of the pointer component 160 has been made smaller, the result will be the pointer 162 moving (vertically) along the dimension axis 124 a smaller percentage of the distance D. The same principle works in reverse. If the first angle 192 is reduced, the second angle 180 remains at forty five (45) degrees, and the PC slide surface 204 is be adjusted to match the reoriented IC slide surface 204, the percentage X of the distance D will increase. As such, changing the first angle 192 but not the second angle 180 is another way to achieve the desired percentage X of the distance D.

In still other alternate embodiments, the first angle 192 could remain at forty five (45) degrees, the second angle 180 could be adjusted, and the PC slide surface 204 can be adjusted to match the IC slide surface 204 to produce the desired percentage X of the distance D. For example, reducing the second angle 180 while keeping the first angle 192 at forty five (45) degrees will reduce the percentage X of the distance D. As such, changing the second angle 180 but not the first angle 192 is yet another way to achieve the desired percentage X of the distance D.

The artisan will recognize that more than one combination of the first angle 192 and the second angle 180 can produce the same percentage X of the distance D and all of the various configurations that work under the principles disclosed above are understood to fall within the scope of the disclosure.

Figure 6:
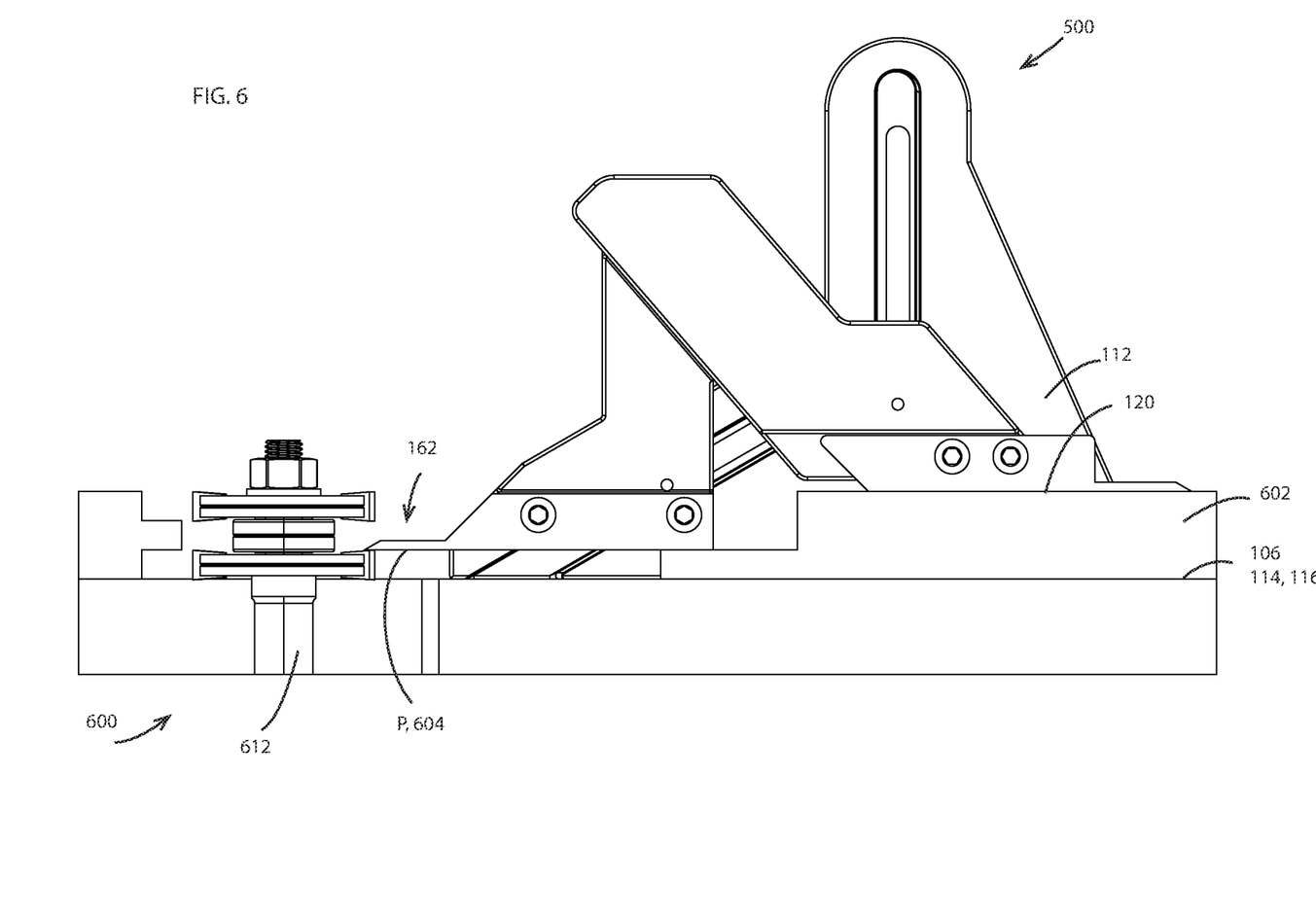
FIG. 6 is a front view of the embodiment of the fit finder tool of FIG. 5 in an example application.

FIG. 6 is a front view of the embodiment of the fit finder tool 500 of FIG. 5 in an example application. In this application, the fit finder tool 500 is configured as a ⅓ finder. The base end 112 rests on the flat surface 116 which is, in the example, a working surface of a router 600. The dimension contact 120 rests atop a workpiece 602 having a dimension D of 0.75". In this example embodiment, a bottom surface 604 of the pointer 162 is the reference surface that indicates the position P of X % D (⅓ D in this example embodiment), which is 0.25" in this example embodiment. The bottom surface 604 is used as a reference so a router bit 612 can be properly positioned.

Figure 7:
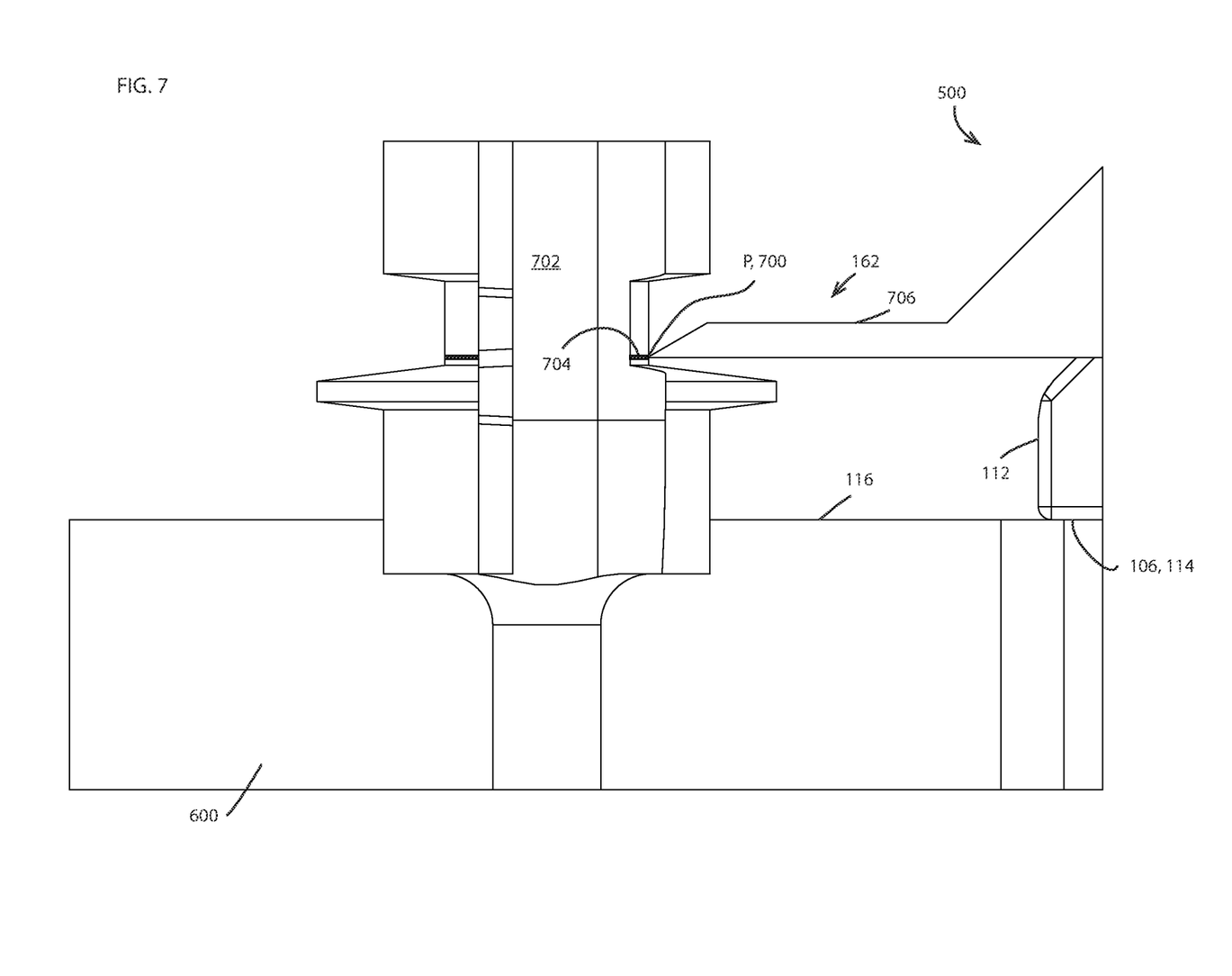
FIG. 7 is a front view of the embodiment of the fit finder tool of FIG. 5 in another example application.

FIG. 7 is a front view of a close up of the embodiment of the fit finder tool 500 of FIG. 5 in an example application. Like in FIG. 6, in this application the base end 112 rests on the flat surface 116 which is, in the example, the working surface of the router 600. In this example embodiment, an edge 700 of the pointer 162 is the reference that indicates the position P of X % D (⅓ D in this example embodiment). The edge 700 is used as a reference so the router bit 702 can be properly positioned using, in this example embodiment, an indicator marking 704 on the router bit 702.

In an alternate example embodiment, the pointer 162 could readily be configured so that an upper surface 706 is used as the reference to indicate the position P that is X % D.

Figure 8:
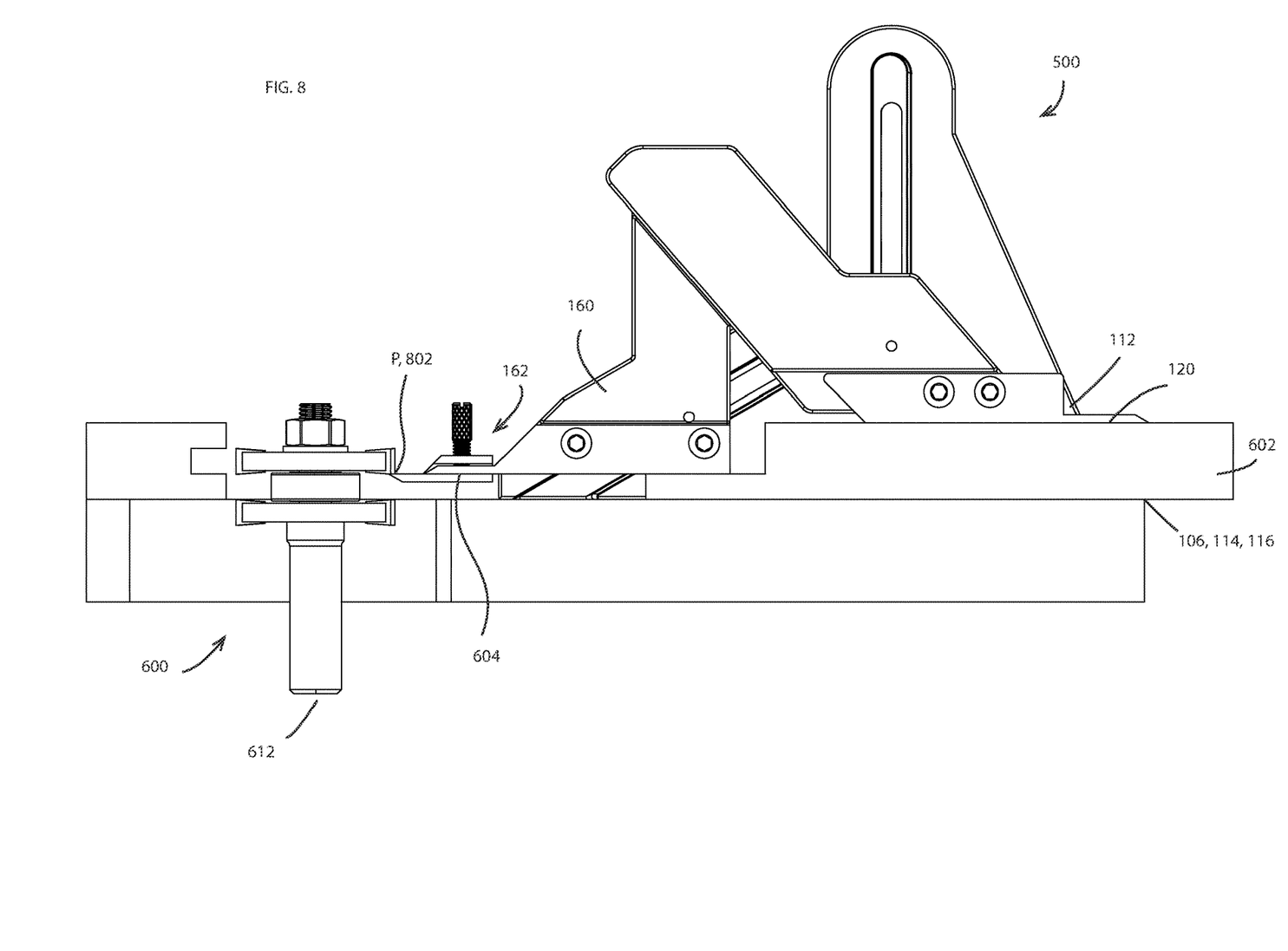
FIG. 8 is a front view of an alternate embodiment of the fit finder tool of FIG. 5 in an example application.

FIG. 8 is a front view of an alternate embodiment of the fit finder tool 500 of FIG. 5 in an example application. Like in FIG. 6, in this application the base end 112 rests on the flat surface 116 which is, in the example, the working surface of the router 600. In this example embodiment, a pointer attachment 800 is secured to the pointer 162 and hence secured to the pointer component 160. In this example embodiment, the pointer attachment 800 has an upper surface 802 that rests against the bottom surface 604 of the pointer 162. Hence, the upper surface 802 of the pointer attachment 800 becomes a reference that indicates the position P of the X % D (⅓ D in this example embodiment). The upper surface 802 is used as a reference so the router bit 612 can be properly positioned.

The pointer attachment 800 can take any shape so that any part of the pointer attachment 800 can become the reference that indicates the position P of X % D.

Figure 9:
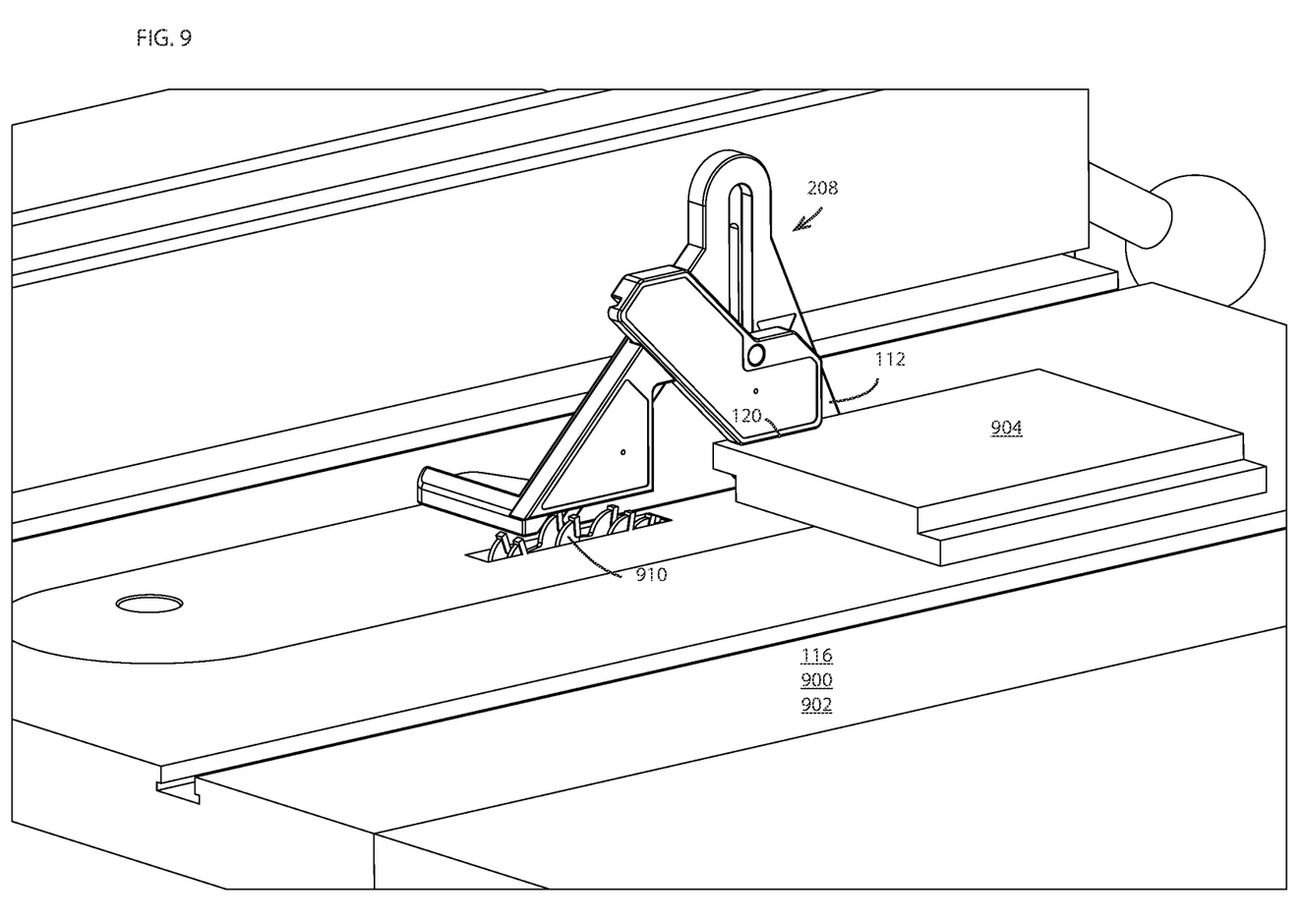
FIG. 9 is a perspective view of the example embodiment of the fit finder of FIG. 2A in an example application.

FIG. 9 is a perspective view of the example embodiment of the fit finder tool 208 of FIG. 2A in an example application. The base end 112 of the fit finder tool 208 is placed on the flat surface 116 which is, in this application, a work surface 900 of a table saw 902. The workpiece 904 rests on the flat surface 116 and the dimension contact 120 rests on the workpiece 904. The flat surface of the pointer 162 rests on a saw blade 910 when the saw blade 910 is at a top of its sweep. In this example embodiment, the fit finder tool 208 is a half finder, so the pointer 162 provides a reference that allows the saw blade to be quickly set to half the depth of the workpiece 904. This greatly simplifies setup for certain cuts such as a rabbet for a joint of the like.

Figure 10:
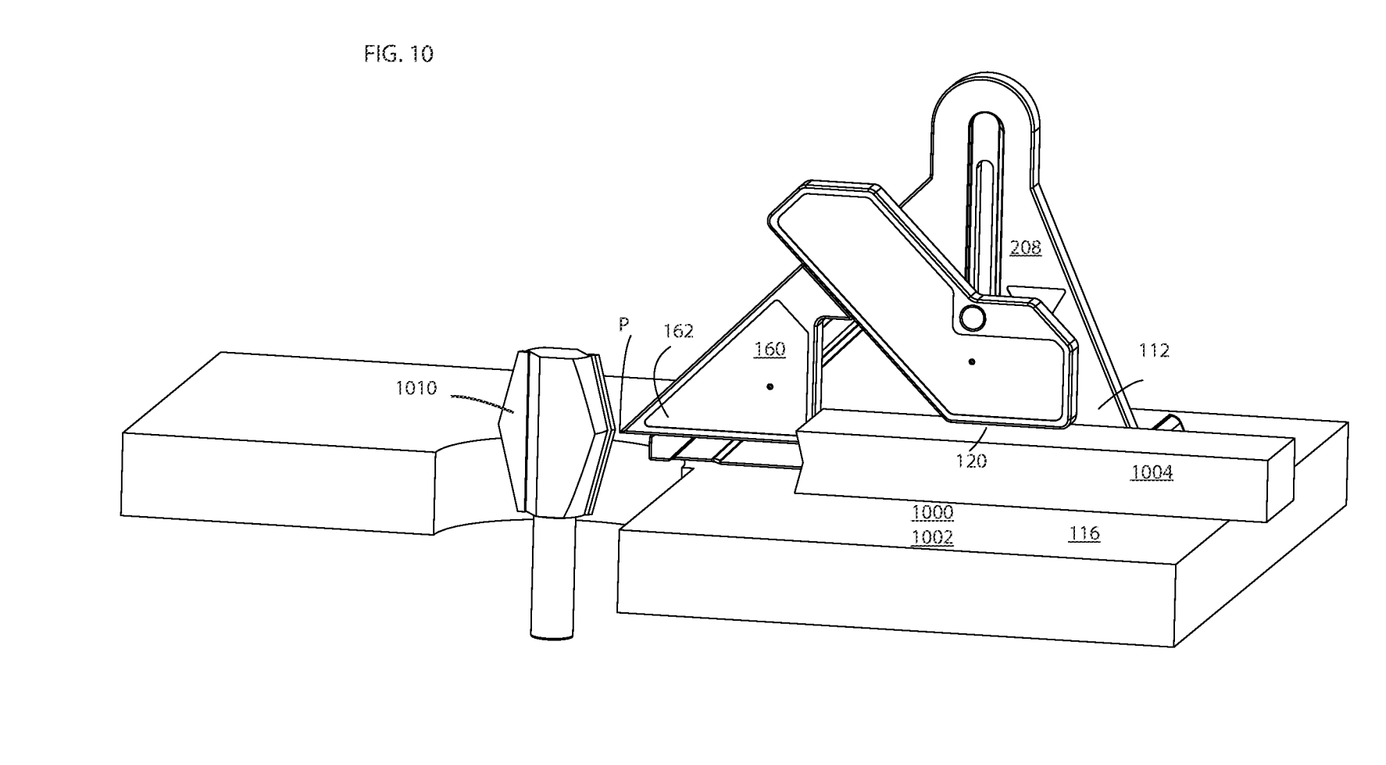
FIG. 10 is a perspective view of the example embodiment of the fit finder of FIG. 2A in another example application.

FIG. 10 is a perspective view of the example embodiment of the fit finder tool 208 of FIG. 2A in an example application. The base end 112 of the fit finder tool 208 is placed on the flat surface 116 which is, in this application, a work surface 1000 of a router 1002. The workpiece 1004 rests on the flat surface 116 and the dimension contact 120 rests on the workpiece 1004. In this example embodiment, the fit finder tool 208 is a half finder, so the edge of the pointer 162 indicates a position P that is half the thickness of the workpiece 1004. The edge of the pointer 162 is then used as a reference so the router bit 1010 can be adjusted to properly position a point on the router bit 1010 meant to be at the same height as the position P.

Figure 11:
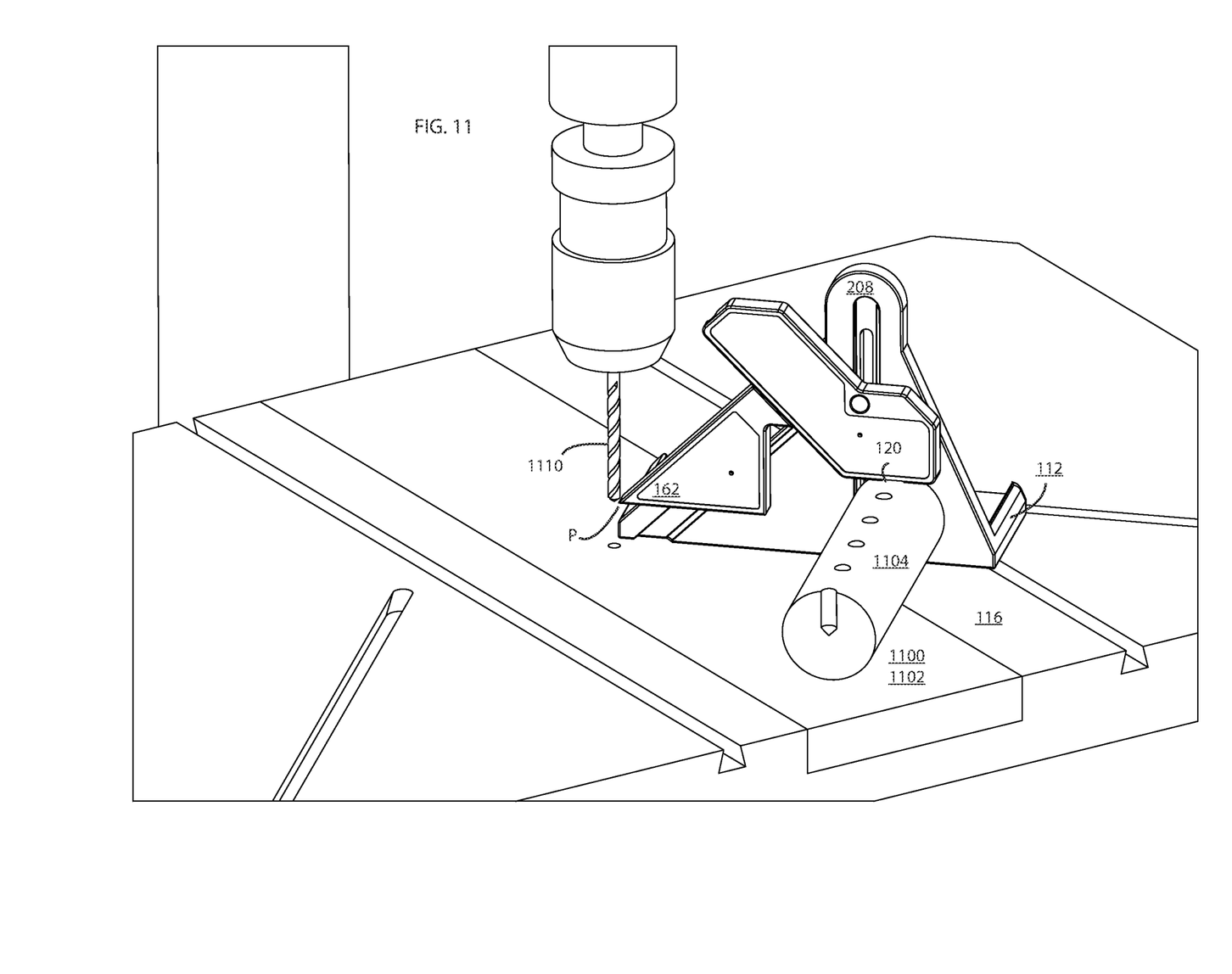
FIG. 11 is a perspective view of the example embodiment of the fit finder of FIG. 2A in another example application.

FIG. 11 is a perspective view of the example embodiment of the fit finder tool 208 of FIG. 2A in an example application. The base end 112 of the fit finder tool 208 is placed on the flat surface 116 which is, in this application, a work surface 1100 of a drill press 1102. The workpiece 1104 rests on the flat surface 116 and the dimension contact 120 rests on the workpiece 1104. In this example embodiment, the fit finder tool 208 is a half finder, so the edge of the pointer 162 indicates a position P that is half the thickness of the workpiece 1104. The edge of the pointer 162 is then used as a reference so an end of a stroke of the drill bit 1110 can be adjusted to correspond to half the thickness of the workpiece 1104. The resulting hole in the workpiece 1104 will be half the thickness.

Figure 12:
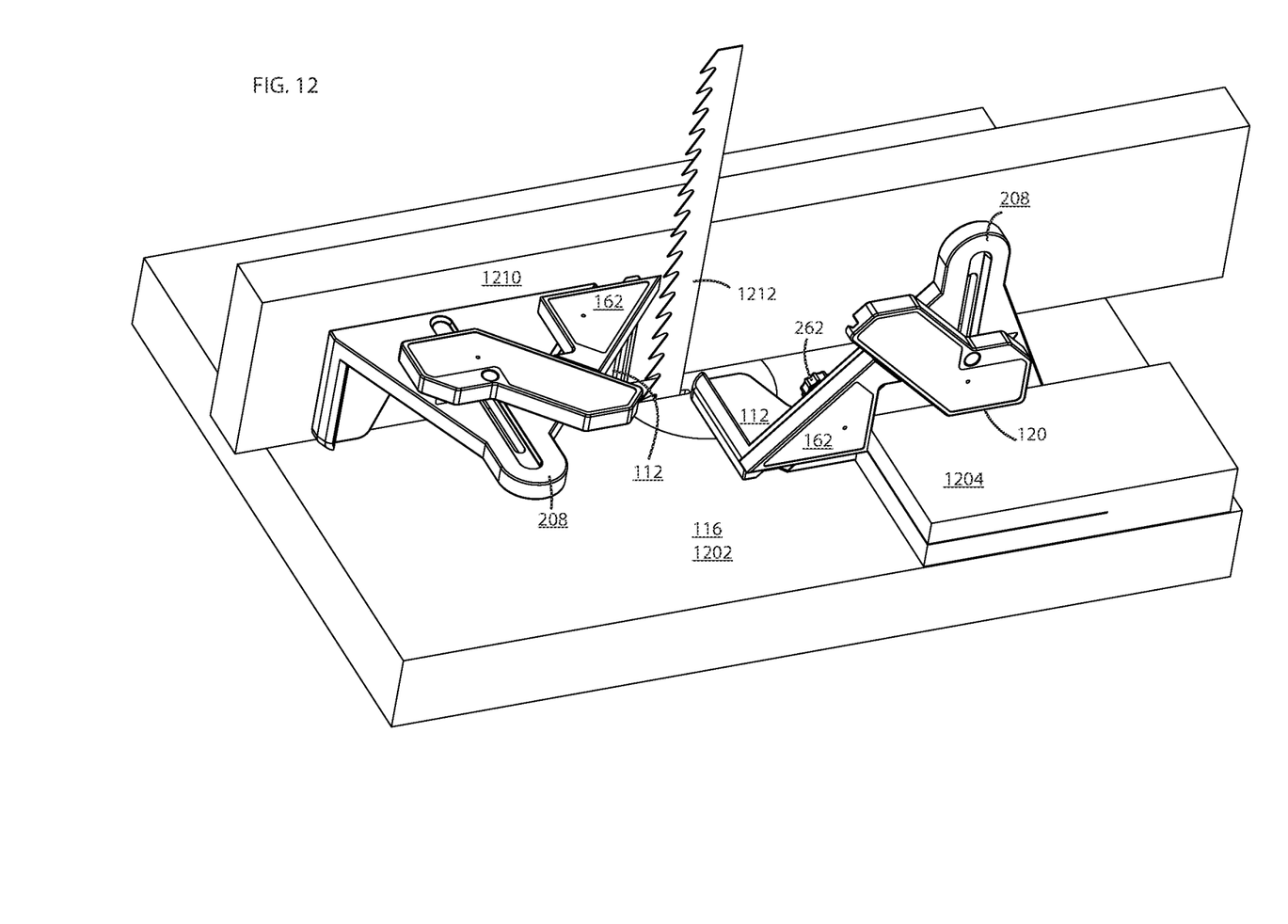
FIG. 12 is a perspective view of the example embodiment of the fit finder of FIG. 2A in another example application.

FIG. 12 is a perspective view of the example embodiment of the fit finder tool 208 of FIG. 2A in an example application. The base end 112 of the fit finder tool 208 is placed on the flat surface 116 which is, in this application, a work surface 1200 of a band saw 1202. The workpiece 1204 rests on the flat surface 116 and the dimension contact 120 rests on the workpiece 1204. In this example embodiment, the fit finder tool 208 is a half finder, so the edge and the flat surface of the pointer 162 indicate a position P that is half the thickness of the workpiece 1104. Once this position P is indicated, the fit finder tool 208 can be moved. In this example embodiment, the base end 112 of the fit finder tool 208 is placed against a fence 1210 of the bandsaw 1202. The position P that indicates half the thickness of the workpiece 1204 is indicated by the pointer 162 and the fence 1210 can be adjusted against this reference position P so that the saw blade 1212 can be properly positioned to make the proper cut in the workpiece 1204.

The fit finder tool discloses herein reduces the lost time and effort associated with trial and error setup of many cuts made during fabrication. Hence, the fit finder represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
   a base reference contact configured to correspond with a first point on a workpiece;
   a dimension contact configured to move relative to the base reference contact along a dimension axis and to correspond with a second point on the workpiece; and
   a pointer operatively associated with the dimension contact such that movement of the dimension contact moves the pointer along the dimension axis an amount that is proportional to and less than an amount the dimension contact moves along the dimension axis.

2. The apparatus of claim 1, wherein the apparatus further comprises a base end that is configured to rest on a flat surface and wherein the base end defines the base reference contact.

3. The apparatus of claim 2, wherein when the base end is disposed on the flat surface the dimension axis is perpendicular to the flat surface and the dimension contact is configured to move away from the flat surface and to sandwich an object between the flat surface and the dimension contact.

4. The apparatus of claim 1, further comprising:
   a base component comprising the base reference contact;
   an intermediate component (IC) comprising the dimension contact and configured to interact with the base component to enable movement of the intermediate component along the dimension axis; and
   a pointer component (PC) comprising the pointer and configured to interact with the base component and with the intermediate component to enable movement of the pointer component along the dimension axis proportionally with the movement of the dimension contact.

5. The apparatus of claim 4,
   wherein the intermediate component comprises an intermediate arm that extends from the intermediate component at a first angle relative to the dimension axis;
   wherein the base component further comprises: a first slot disposed parallel to the dimension axis along which the intermediate component moves; and a second slot disposed at a second angle to the first slot along which the pointer component moves;
   wherein an IC/PC engagement between the intermediate arm and the pointer component enables the pointer component to move along the intermediate arm as the intermediate component moves along the first slot; and
   wherein the first angle and the second angle determine a proportion the pointer component moves along the first slot and thereby along the dimension axis of the amount the dimension contact moves along the dimension axis.

6. The apparatus of claim 5, wherein the first angle is 45 degrees, the second angle is 45 degrees, and the amount that is proportional to and less than the amount the dimension contact moves along the dimension axis is 50%.

7. The apparatus of claim 5, wherein the first angle is 49.1 degrees, the second angle is 30 degrees, and the amount that is proportional to and less than the amount the dimension contact moves along the dimension axis is ⅓.

8. An apparatus, comprising:
   a base reference contact that defines a base reference point;

a dimension contact that defines a dimension contact point configured to move along a dimension axis that connects the base reference point and the dimension contact point; and a pointer configured to move relative to the dimension axis as the dimension contact moves along the dimension axis and to indicate a position along the dimension axis that is a select percentage of a distance along the dimension axis between the base reference point and the dimension contact point.

9. The apparatus of claim 8, wherein the base reference contact defines a base contact plane containing the base reference point, and wherein the dimension axis is perpendicular to the base contact plane.

10. The apparatus of claim 9, further comprising a base component comprising a base end configured to rest on a flat surface, wherein the base end forms the base reference contact.

11. The apparatus of claim 10, wherein when the base end is disposed on the flat surface the dimension contact is configured to move away from the flat surface and to sandwich an object between the flat surface and the dimension contact.

12. The apparatus of claim 8, further comprising:
a base component comprising the base reference contact;
an intermediate component (IC) comprising the dimension contact and configured to move along the dimension axis via an IC/base engagement; and
a pointer component (PC) comprising the pointer and configured to interact with the base component and with the intermediate component to enable movement of the pointer along the dimension axis proportionally with movement of the dimension contact.

13. The apparatus of claim 12, further comprising a geometric arrangement that determines the select percentage the pointer component moves along the dimension axis as the intermediate component moves along the dimension axis.

14. The apparatus of claim 13, wherein the geometric arrangement comprises:
an intermediate arm of the intermediate component that extends at a first angle relative to the dimension axis;
an IC/PC engagement between the intermediate arm and the pointer component; and
a PC/base engagement between the pointer component and the base component along which the pointer component moves when the intermediate component moves along the dimension axis via the IC/base engagement.

15. The apparatus of claim 14, wherein the IC/base engagement comprises a first slot in the base component and oriented parallel to the dimension axis; and wherein the PC/base engagement comprises a second slot in the base component and oriented at a second angle relative to the dimension axis.

16. The apparatus of claim 15, wherein the IC/PC engagement comprises a sliding engagement therebetween that permits the pointer component to slide along the intermediate component as the intermediate component moves along the dimension axis.

17. The apparatus of claim 15, wherein the first angle determines horizontal movement of the pointer component moves as the intermediate component moves along the dimension axis, and the second angle determines vertical movement of the pointer component in response to the horizontal movement.

18. The apparatus of claim 15, wherein the first angle is 45 degrees, the second angle is 45 degrees, and the select percentage is 50%.

19. The apparatus of claim 15, wherein the first angle is 49.1 degrees, the second angle is 30 degrees, and the select percentage is ⅓.

20. An apparatus, comprising:
a base reference contact;
a dimension contact configured to move relative to the base reference contact and to define a distance between the dimension contact and the base reference contact; and
a pointer configured to point to a location between the base reference contact and the dimension contact at a select percentage of the distance.

21. The apparatus of claim 20, wherein the base reference contact is associated with a bottom of an object and the dimension contact is associated with a top of the object such that the distance equals a dimension of the object between the dimension contact and the base reference contact.

22. The apparatus of claim 21, wherein the base reference contact is configured to rest on a flat surface, and wherein when the base contact rests on the flat surface the dimension contact moves along a dimension axis that is perpendicular to the flat surface and the dimension contact contacts a top of the object that also rests on the flat surface.

* * * * *